(12) United States Patent
Smith et al.

(10) Patent No.: US 7,506,729 B2
(45) Date of Patent: Mar. 24, 2009

(54) TORQUE-LIMITED ELECTRIC SERVO SYSTEM FOR DEPLOYING A VEHICLE SNOW CHAIN TRACTION SYSTEM

(75) Inventors: Fred P. Smith, Alpine, UT (US); John H. Atkinson, Jr., Provo, UT (US)

(73) Assignee: Smith Patents, LLC, Alpine, UT (US)

(*) Notice: Subject to any disclaimer, the term of this patent is extended or adjusted under 35 U.S.C. 154(b) by 420 days.

(21) Appl. No.: 10/586,034

(22) PCT Filed: Jan. 13, 2004

(86) PCT No.: PCT/US2004/000847

§ 371 (c)(1), (2), (4) Date: Jul. 13, 2006

(87) PCT Pub. No.: WO2005/070737

PCT Pub. Date: Aug. 4, 2005

(65) Prior Publication Data

US 2008/0257672 A1    Oct. 23, 2008

(51) Int. Cl.
*B60T 1/00* (2006.01)
(52) U.S. Cl. ...................... 188/4 B; 280/757
(58) Field of Classification Search ............... 188/4 B, 188/5, 6; 280/757; 152/208, 214; 74/108
See application file for complete search history.

(56) References Cited

U.S. PATENT DOCUMENTS

| | | | | |
|---|---|---|---|---|
| 6,651,783 B1 * | 11/2003 | Atkinson, Jr. | ............... | 188/4 B |
| 6,830,134 B2 * | 12/2004 | Choi | ............... | 188/4 B |
| 7,118,130 B2 * | 10/2006 | Rosenbalm | ............... | 280/757 |
| 2005/0028640 A1 * | 2/2005 | Laurent et al. | ............... | 74/664 |

* cited by examiner

*Primary Examiner*—Christopher P Schwartz
(74) *Attorney, Agent, or Firm*—Angus C. Fox, III

(57) ABSTRACT

A single unit of the new deployment system includes a housing to which an electric drive motor is externally mounted. The deployment system for each vehicle requires at least a pair of deployment units: one each for right and left wheels. Each unit includes a reversible electric drive motor having an armature shaft; an intermediate drive shaft; a worm axially affixed to the intermediate drive shaft; an output shaft; a shock damper affixed to the output shaft; a worm gear affixed to the shock damper, the worm gear meshing with the worm, and providing rotational locking for said output shaft; and a deployment arm coupled to the output shaft, the deployment arm having rotatably mounted thereto a friction drive disc, said friction drive disc having peripherally attached thereto a plurality of chain segments. Torque applied to the output shaft by the electric motor is limited either by a spring-loaded clutch axially mounted on the intermediate drive shaft or by a circuit which limits current drawn by the electric drive motor to a preset maximum.

20 Claims, 12 Drawing Sheets

TORQUE-LIMITED ELECTRIC SERVO SYSTEM FOR DEPLOYING A VEHICLE SNOW CHAIN TRACTION SYSTEM

BACKGROUND OF THE INVENTION

1. Field of the Invention

This invention relates to vehicle ice and chain traction systems which may be both rapidly deployed and rapidly retracted. More particularly, it relates to electrically-powered apparatuses for deploying a mounted system so that the components thereof are moved from a stowed configuration to an operable configuration.

2. Description of Related Art

Rapidly-deployable chain traction systems, which may be characterized generally as systems which fling short chain or cable segments beneath a road tire, have been known for some 90 years. Such a system is disclosed in U.S. Pat. No. 1,045,609 and in German Pat. No. No. 266,487 to W. H. Putnam for an ANTISKIDDING DEVICE. Throughout the years, various modifications and improvements have been made by numerous inventors. The following list is a representative list of a dozen other U.S. patents issued in this field:

- U.S. Pat. No. 1,150,148 for a TRACTION AND ANTI-SKIDDING DEVICE;
- U.S. Pat. No. 1,223,070 for an ANTISKIDDING DEVICE FOR VEHICLES;
- U.S. Pat. No. 1,374,252 for an ANTISKID DEVICE FOR AUTOMOBILES;
- U.S. Pat. No. 1,381,001 for a NON-SKID DEVICE FOR MOTOR AND OTHER VEHICLES;
- U.S. Pat. No. 1,975,325 for an ANTISKID CHAIN AND MEANS FOR APPLYING AND REMOVING SAME;
- U.S. Pat. No. 2,241,923 for an AUTOMATIC EMERGENCY TRACTION DEVICE FOR AUTOMOBILES;
- U.S. Pat. No. 2,264,466 for an ANTISKID DEVICE FOR VEHICLES;
- U.S. Pat. No. 2,277,036 for an ANTISKID DEVICE;
- U.S. Pat. No. 2,283,948 for an AUTOMOBILE TRACTION DEVICE;
- U.S. Pat. No. 2,442,322 for an ANTISKID DEVICE;
- U.S. Pat. No. 4,299,310 for an ANTISKID DEVICE FOR MOTOR VEHICLES;
- U.S. Pat. No. 4,800,992 for an ANTI-SKID DEVICE; and
- U.S. Pat. No. Des. 286,524 for ANTI SKID CHAIN UNIT FOR VEHICLE TIRES.

Referring now to the prior-art system of FIG. 1, a modern rapidly-deployable chain traction system 100 is depicted in its deployed configuration in this rear elevational view drawing. The chain traction system 100 is removably affixed to a drive axle 101 which incorporates a differential unit 102. Inner and outer road wheels (103A and 103B, respectively) are mounted on the visible half of the drive axle 101. On each road wheel (103A and 103B) is mounted a rubber tire (104A and 104B, respectively). The chain system 100 includes a friction drive disc 105 to which a plurality of chain segments 106A, 106B and 106C are attached. Chain segment 106A is depicted as being below the road surface 114, which is normally covered with a layer of snow or ice when the chain system 100 is in the deployed configuration. The friction drive disc 105 is rotatably mounted on a spindle 107 which is affixed to a support member 108 which is pivotally mounted to a mounting bracket 109. The mounting bracket is, in turn, bolted to the U-bolt shackles 113 which secure the suspension leaf springs 112 to the drive axle 101. The chain system 100 also includes a pneumatic cylinder 110 that is bolted to the mounting bracket 109. The pneumatic cylinder 110 has a slidable piston 111 that is held in a normally retracted position within cylinder 110 by spring biasing when pressure within cylinder 108 equals ambient pressure. The outer end of piston 111 is connected to support member 108. In the deployed configuration, the outer rim of friction drive disc 105 is pressed against the sidewall of tire 104A by a biasing force applied to support member 108 by piston 111. The biasing force is provided by pneumatic pressure inside pneumatic cylinder 110 which overcomes the spring biasing and causes piston 111 to extend. As the tire 104A rotates, the friction drive disc 105 also rotates with the chain segments 106 extended more or less radially therefrom. Thus each chain segment 106 is flung, sequentially, beneath the tread portion of tire 104A. In order to retract the system and disengage the friction drive disc 105 from contact with the sidewall of tire 104A, pneumatic pressure to pneumatic cylinder 110 is cut off, causing piston 111 to retract within cylinder 110 and raising the support member 108, the rotatably attached friction drive disc 105 and the attached chain segments 106. In the retracted configuration, the chain segments 106 do not touch the road surface 114.

Referring now to the side view of the modern prior-art modern rapidly-deployable chain traction system 100 of FIG. 2, the pneumatic deployment components and the mounting system are shown in greater detail. The mounting system shown is designed for use on vehicles which have a beam or live axle (i.e., one which incorporates a differential) 101. On each side of the vehicle, the apparatus mounts to U-bolt shackles which commonly secure the axle to a set of leaf springs 112 or an air bag assembly (not shown). If no U-bolts are present on the axle, a new set of U-bolts may be installed thereon and used to secure the system. In either case, the new mounting system is designed to be mounted directly to the exposed, threaded ends of the U-bolt shackles coupled to two sets of leaf springs (see 112 of FIG. 1). Each leaf spring set is coupled to the beam axle or axle housing (in the case of a live axle) with a pair of U-bolt shackles 113, which are tied together beneath the axle or axle housing with a flat tie plate 114 that is secured with four standard nuts 115 (two on each U-bolt). The mounting system is designed to be mounted directly to the exposed, threaded ends of the U-bolt shackles 113.

Although various mechanical means, such as cables and gears, have been used in the past to deploy chain traction systems, the current genre of chain traction systems relies almost exclusively on pneumatic cylinders for deployment. The primary problem associated with chain traction systems deployed by pneumatic cylinders is that the system may be too bulky for certain applications, such as installation on light-duty pickup trucks. One major problem associated with prior art gear-driven deployment systems is that uneven road surfaces imposed a potentially destructive shock load on the gear train when the chain traction system was in a retracted state. The shock loads had a tendency to shear the teeth off of gears in the deployment gear train. The shock loads could also fracture the housing used to contain the gear train. Another major problem associated with gear-driven deployment systems is that of grit, water, and corrosion related to inadequate protection of the gear train. For a gear-driven deployment system to function reliably, it is essential that all gears and all bearings be completely sealed from the harsh environment beneath the vehicle. Without proper sealing, the life expectancy of such systems would likely be no more than one winter season. Gear driven deployment systems for a chain traction system, if not manually operated, require some type of motor for automatic operation. For most vehicles, the only type of motor that makes sense is an electric motor, as electric power is readily available from the vehicle's storage battery. Although the automotive industry has solved the problems related to operation of electric motors in a harsh environment (e.g. engine starter motors), in the case of an electric-powered chain traction system, there is still the problem of how to start and stop the electric motor at the appropriate times. If limit switches are to be used, they must be completely sealed in order to protect their delicate circuitry.

What is needed is an electric-powered, gear-driven deployment system for chain traction systems that: (1) is sufficiently compact for installation on a wide variety of vehicles; (2) is completely sealed from the environment; (3) is relatively simple to install and operate; (4) is not subject to damage from shock loads imposed by uneven road surfaces; and (5) solves the problems related to limiting the travel of the device during deployment and retraction.

SUMMARY OF THE INVENTION

The present invention answers the needs expressed in the foregoing section. A new electric-motor-powered, gear-driven deployment system for rapidly-deployable chain traction systems is provided that is compact, sealed from the environment, relatively simple to install and operate, protected from shock load damage to the gear train, and utilizes a timed deployment sequence to avoid the use of limit switches in the harsh environment beneath the vehicle. The deployment system for each vehicle requires at least a pair of deployment units: one each for right and left wheels. Torque applied to the output shaft of the deployment system by the electric motor is limited either by a spring-loaded clutch axially mounted on the intermediate drive shaft or by a circuit which limits current drawn by the electric drive motor to a preset maximum.

A single unit of the new deployment system includes a housing to which an electric drive motor is externally mounted. By reversing the polarity of the electric current, the direction of revolution of the electric drive motor can be reversed. The output shaft of the drive motor extends through an input aperture within a wall of the housing. For a preferred embodiment of the invention, the output shaft is fitted with an 18-tooth drive spur pinion gear. The spur pinion gear drives a 72-tooth driven spur gear for a gear reduction ration of 4:1. The driven spur gear is mounted on an intermediate drive shaft that is rotatably mounted within the housing. For a first embodiment of the invention, torque applied to the output shaft is limited by a spring-loaded clutch axially mounted on the intermediate drive shaft that couples the driven spur gear to the intermediate drive shaft. For a second embodiment of the invention, the spring-loaded clutch is eliminated, altogether, and torque applied to the output shaft by the electric motor is limited by MOSFET H-Bridge circuit which limits current drawn by the electric drive motor to a preset maximum. For either embodiment, the spur gears may be replaced with a more costly helical-gear or bevel-gear train with a similar gear reduction ratio. The intermediate drive shaft incorporates a worm that is spaced from the driven spur gear and spring-loaded clutch. The worm operates on a worm gear that is coupled to an output shaft via a spring-loaded damper. The output shaft extends through a sealed output aperture in the housing. The deployment arm of a rapidly-deployable chain traction system (including the rotatably attached friction drive disc and associated chain segments) is rigidly affixed to the end of the output shaft that is external to the housing. The spring-loaded shock damper protects the gear train against shock loads imposed by rotational moments applied to the output shaft by the lever arm, which are caused primarily by forces attributable to uneven road surfaces acting on the rotationally unbalanced mass of the combined deployment arm, friction drive disc and associated chain segments. The spring constant of the coil spring employed within the shock damper is selected as a function of the moment of inertia of the rotationally unbalanced mass.

In order to deploy the first embodiment system, current is applied to the electric motor for a preset period of time. The time period is slightly greater than the measured time for full deployment from a fully retracted position. Slippage of the spring-loaded clutch on the intermediate drive shaft ensures that full deployment will occur. In order to retract the system, current of reverse polarity is applied to the electric motor for a preset time period that is slightly greater than the measured time for full retraction from a fully deployed position. As a practical matter, the time required for retraction is slightly greater than the time required for deployment, as the output of the motor is identical in both directions, gravity is working against the system during retraction, and the chain segments may need to be pulled from beneath the vehicle's tires.

PREFERRED EMBODIMENT OF THE INVENTION

Figure 1:
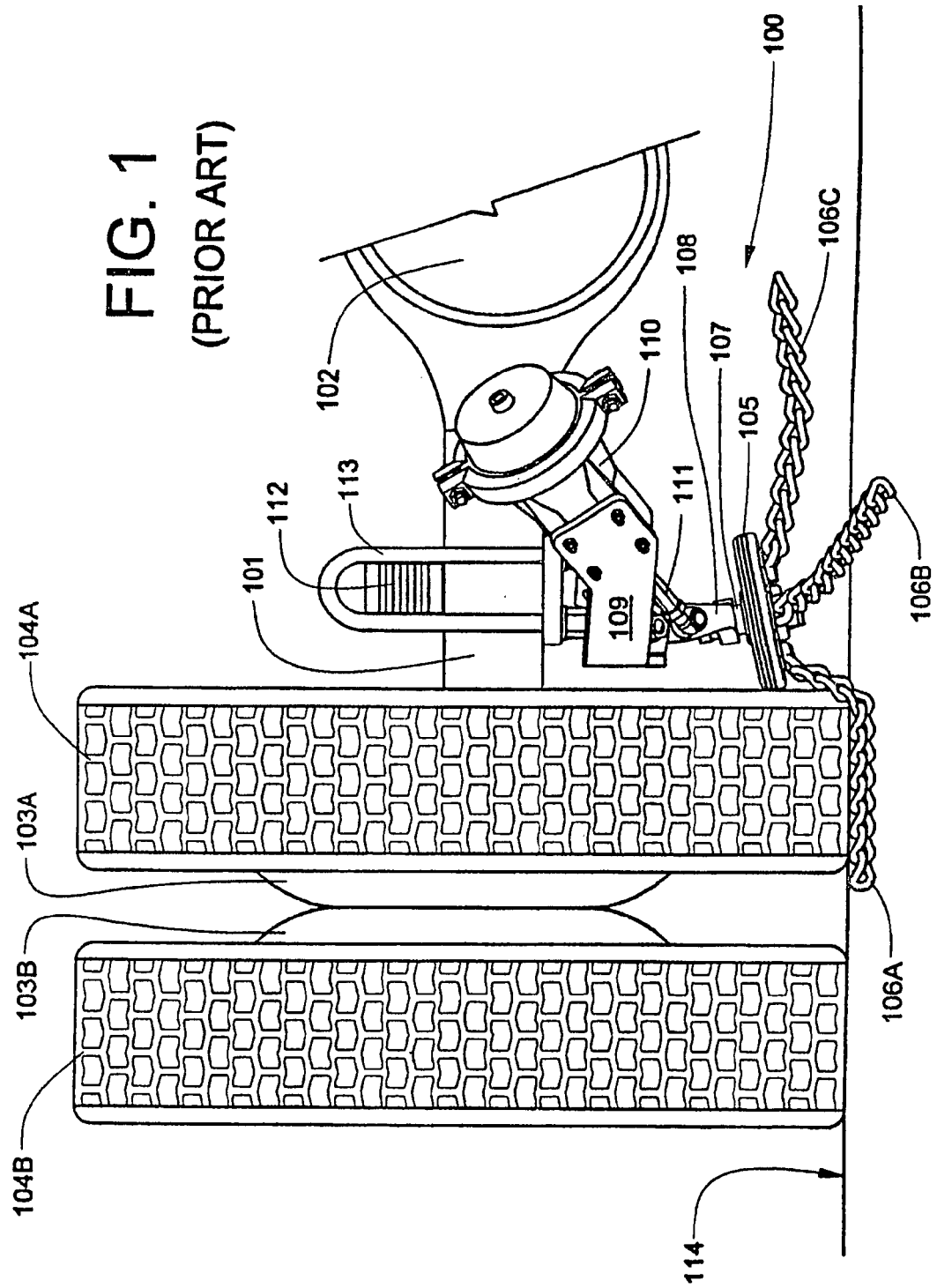
FIG. 1 is a rear elevational view of a typical modern prior-art rapidly-deployable chain traction system.

In accordance with the present invention, a new gear-driven deployment system for a rapidly-deployable chain traction system is provided. A single unit of the new gear-driven deployment system will be described with reference to the attached drawing figures. It should be understood that a complete system requires the use of at least two units: one for each drive wheel. The drawing figures are intended for the purpose of illustrating a preferred embodiment of the invention only, and not for purpose of limiting the same.

Figure 2:
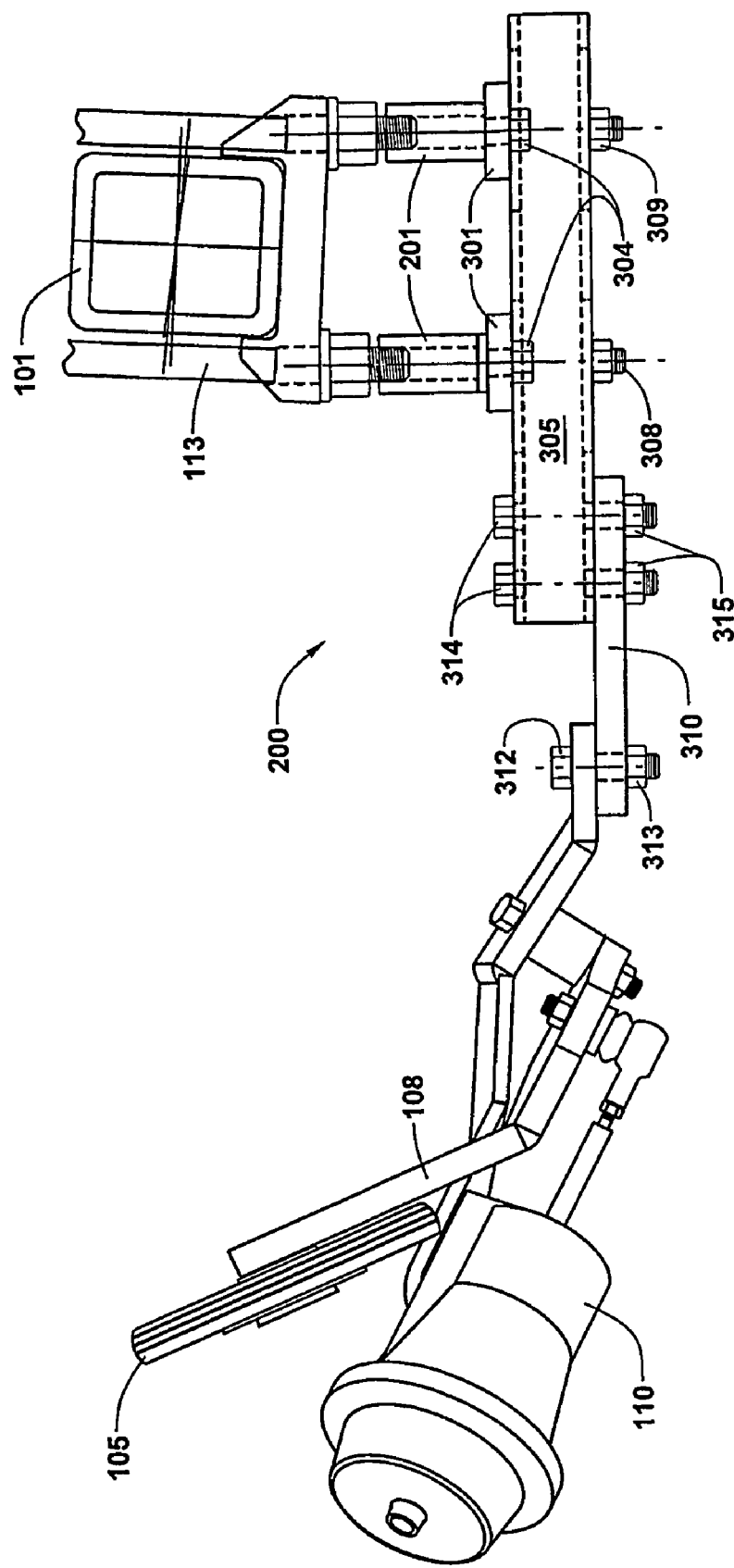
FIG. 2 is a side elevational view of a typical modern prior-art rapidly-deployable chain traction system.
Figure 3:
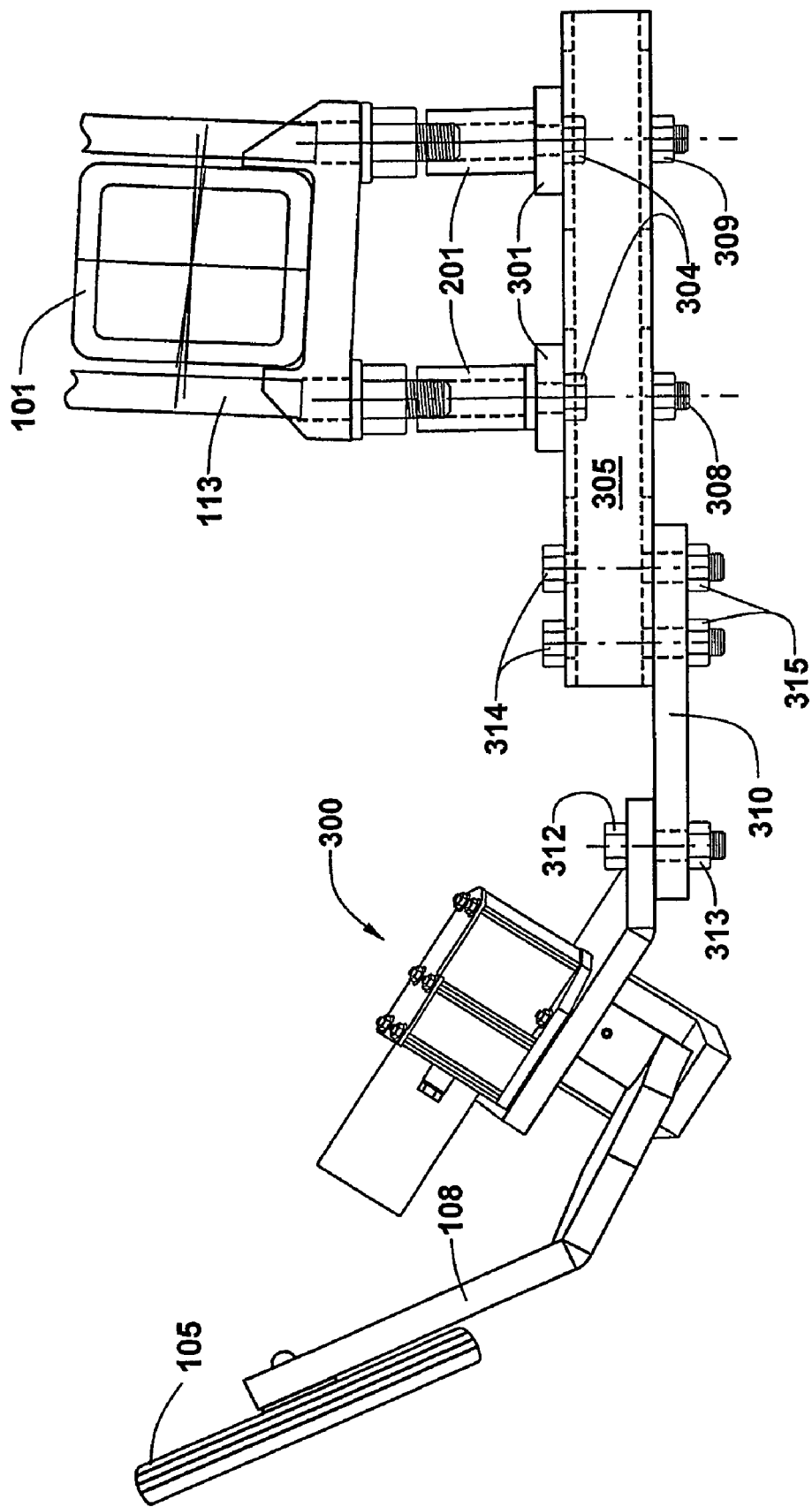
FIG. 3 is a side elevational view of a rapidly-deployable chain traction system which incorporates the new electric-powered, gear-driven deployment system.

Referring now to FIG. 3, a single unit 300 of the new gear-driven deployment system is shown mounted to a beam axle 101 using the mounting system shown in FIG. 2. It will be noted that the primary difference between the deployment system shown in FIG. 2 and that shown in FIG. 3 is that the pneumatic cylinder 110 of FIG. 2 has been replaced by a single gear-driven deployment unit 300 and the mounting bracket 109 of FIG. 2 has been replaced with a modified mounting bracket 301, which incorporates an angle bracket extension 302 having a sealed ball-bearing race (not shown) installed therein. The sealed ball-bearing race functions as an end support for the output shaft (see item 417 of FIG. 4) of the gear-driven deployment system unit 300. The deployment arm 303 is affixed to the output shaft 417.

Figure 4:
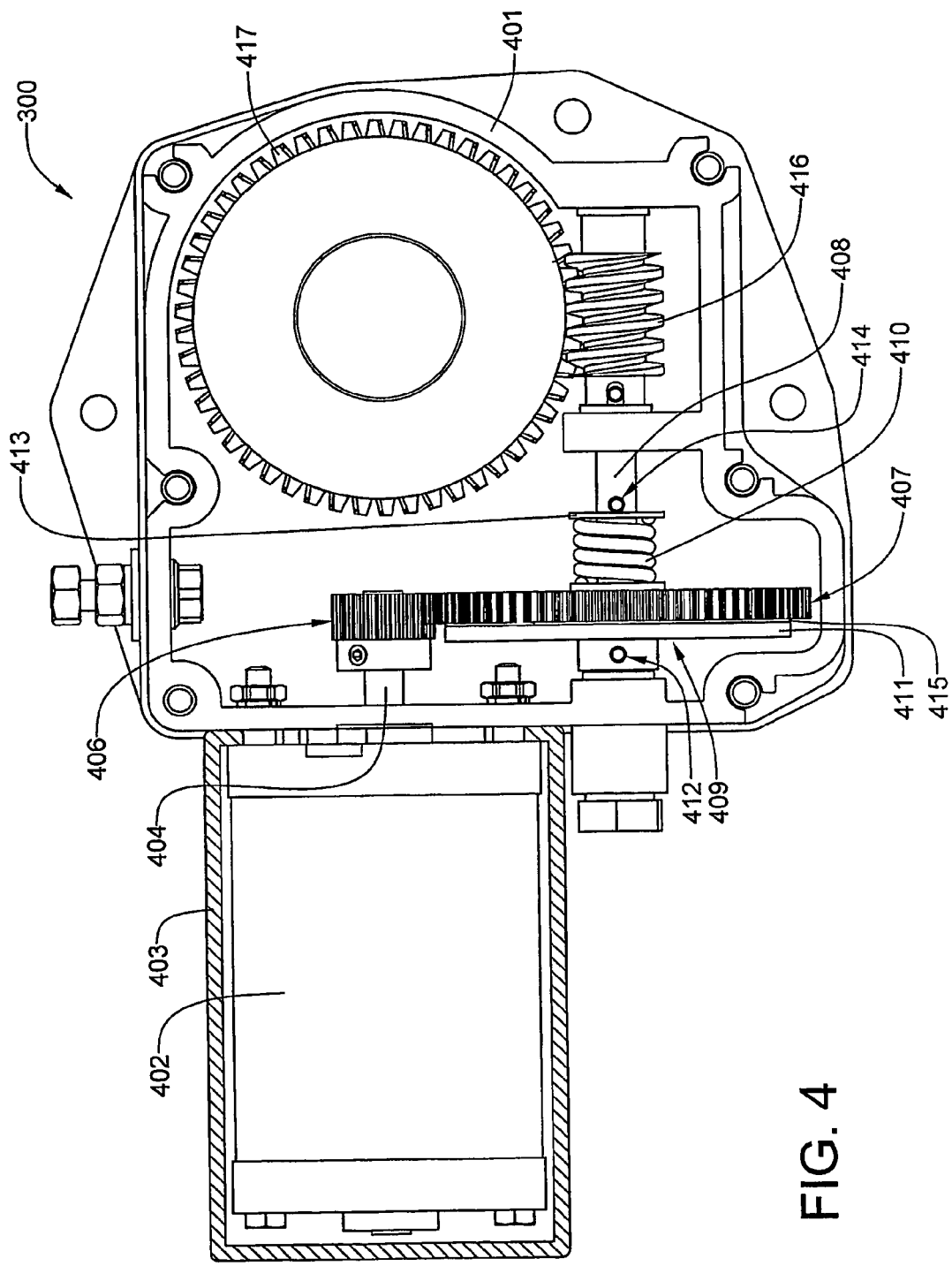
FIG. 4 is a top plan, partial cut-away view of one unit of a clutch-equipped first primary embodiment of the new electric-powered, gear-driven deployment system, with the top cover removed to show internal components.

Referring now to FIG. 4, a single unit of the new deployment system 300 includes a housing 401 to which an electric drive motor 402 is externally mounted. The electric drive motor 402 is enclosed in a water-tight motor canister 403. By reversing the polarity of the electric current applied to the electric drive motor 402, the rotational direction of the electric drive motor 402 can be reversed. The electric drive motor 402 has an armature shaft 404, which extends through an input aperture (not shown) within a side wall 405 of the housing 401. For a preferred embodiment of the invention, the output shaft 404 is fitted with an 18-tooth drive spur pinion gear 406. The spur pinion gear 406 drives a 72-tooth driven spur gear 407 for a gear reduction ration of 4:1. The driven spur gear 407 is mounted on an intermediate drive shaft 408 that is rotatably mounted within the housing 401. For a first primary embodiment of the invention, the driven spur gear 407 rotates on the intermediate drive shaft 408, and is coupled thereto via a spring-loaded clutch 409, which has a biasing spring 410 and a driven disc 411 that is secured to the intermediate drive shaft with a first roll pin 412. The compressed biasing spring 410 is sandwiched between a retainer washer 413 that is held in place on the intermediate drive shaft 408 by a second roll pin 414, and the driven spur gear 407. A paper friction disc 415 is placed between the driven spur gear 407 and the driven disc 411. As an option, the spur gears 406 and 407 may be replaced with a more costly helical-gear or bevel-gear train with a similar gear reduction ratio. The intermediate drive shaft 408 incorporates a worm 416 that is spaced from the driven spur gear 407 and the spring-loaded clutch 409.

Figure 5:
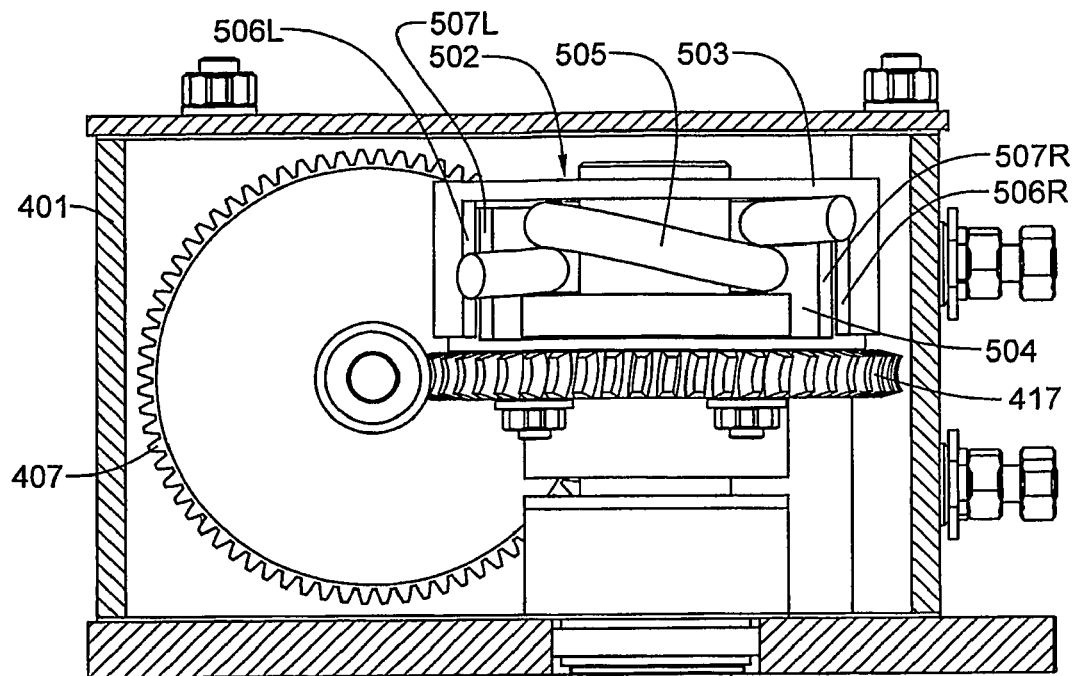
FIG. 5 is a front cut-away view of one unit of the first primary embodiment of the new electric-powered, gear-driven deployment system, showing internal components and electrical terminals for motor connection.

Referring now to both FIG. 4 and FIG. 5, the worm 416 operates on a worm gear 417 that is coupled to an output shaft 501 via a spring-loaded damper 502. The combination of the worm 416 and the worm gear 417 serve to lock the output shaft 501 in any position to which it is rotated. The spring-loaded damper 502 includes upper and lower nested, coaxial, closed-end cylinders (503 and 504, respectively), each of which has an arcuate portion of its cylindrical wall removed, and which, together, form a can in which is housed a coiled, normally-unloaded shock-absorbing spring 505. The edges of the remaining cylindrical walls 506R, 506L, 507R and 507L act on the ends of the shock-absorbing spring 505. Rotational moments applied to the output shaft 501 in either direction cause circumferential loading, as opposed to torsional loading, of the spring. The output shaft 501 extends through a sealed output aperture (not shown in this view) in the housing 401. The deployment arm 303 of a rapidly-deployable chain traction system is rigidly affixed to the end of the output shaft that is external to the housing. The friction drive disc 105 is rotatably attached to the deployment arm 303 and a plurality of chain segments 106A, 106B and 106C are attached to the friction drive disc 105. The spring-loaded shock damper 502 protects the gear train against shock loads imposed by rotational moments applied to the output shaft 501 by the deployment arm 303, which are caused primarily by forces attributable to uneven road surfaces acting on the rotationally unbalanced mass of the combined deployment arm 303, friction drive disc 105 and associated chain segments. The spring constant of the shock-absorbing spring 505 (see FIG. 6) employed within the shock damper 502 is selected as a function of the moment of inertia of the rotationally unbalanced mass. It will be noted that a pair of electrical terminals 507U and 507L are visible in this view. At least one of the terminals is insulated from the housing 401. Electrical connections are made from these terminals 507U and 507L to the electric drive motor 402 through the inside of the housing 401.

Figure 6:
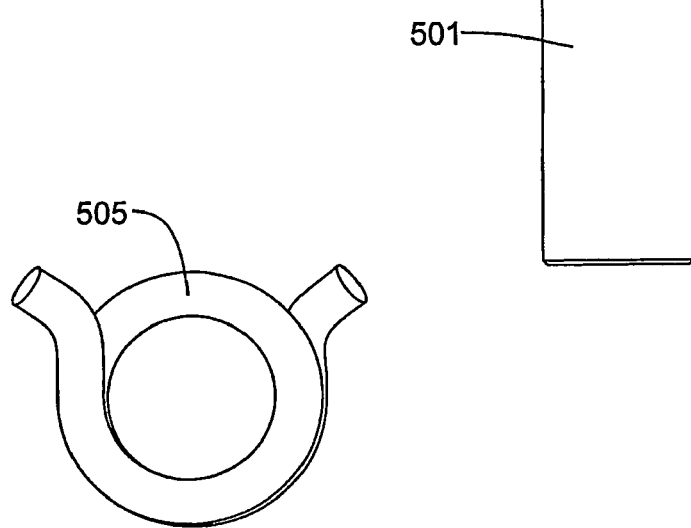
FIG. 6 is a top plan view of the coil spring used for shock decoupling of the drive shaft from the gear train.

Referring now to FIG. 6, the shock-absorbing spring 505 is seen more completely in this view. It will be noted that the spring is circumferentially loaded by either spreading the ends 601A and 601B apart or squeezing them together.

Figure 7:
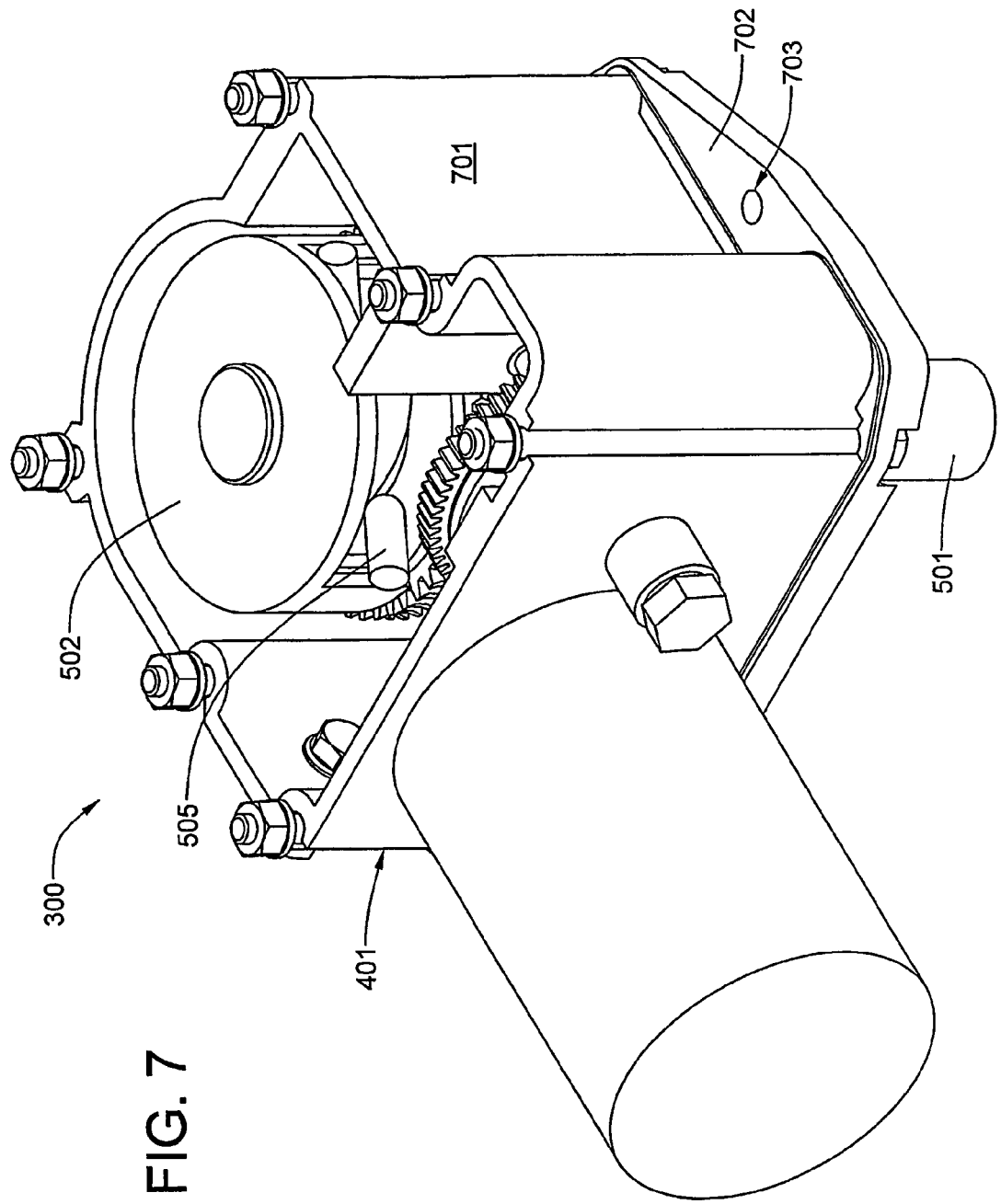
FIG. 7 is a perspective view of one unit of the first primary embodiment of the new electric-powered, gear-driven deployment system with the top cover removed to show internal components.

Referring now to the isometric view of FIG. 7, the housing 401 of a single unit of the new deployment system 300 includes a top cover (see item 801 of FIG. 8) a perimetric wall portion 701 and a base 702. The perimetric wall portion 701 may be formed as a single aluminum extrusion. The top cover 801 and the base 702 may be formed from a structural metal such as steel or aluminum. In this view, the shock damper 502 is visible in perspective. The output shaft 501 is axially welded to the upper closed-end cylinders 503. The shock-absorbing spring 505 is also visible in this view. Mounting holes 703 are provided in the base 702.

Figure 8:
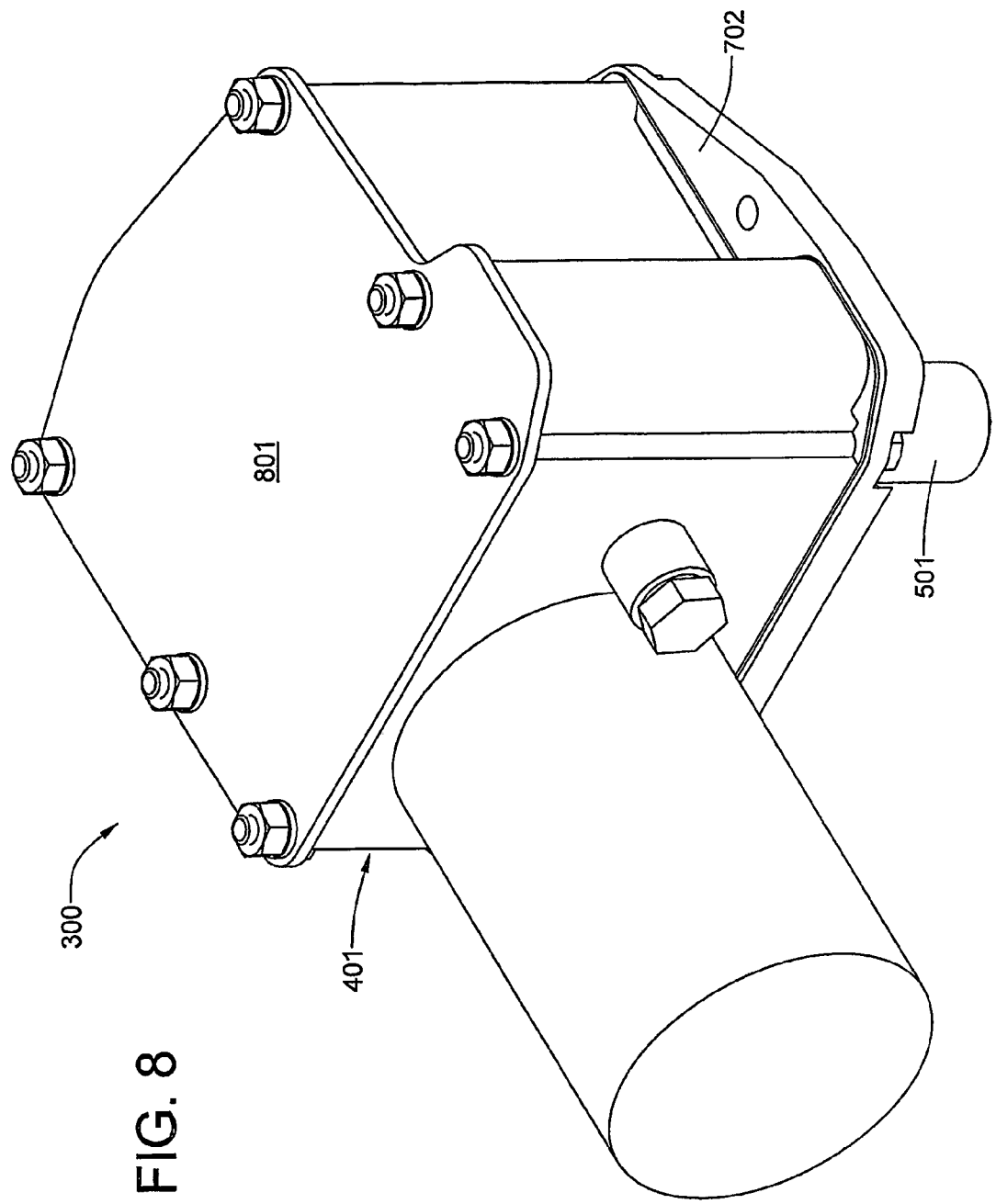
FIG. 8 is a perspective view of one unit of the first primary embodiment of the new electric-powered, gear-driven deployment system.

Referring now to FIG. 8, the top cover 801 has been bolted on the housing 401 of the deployment system unit 300 shown in FIG. 7.

Figure 9:
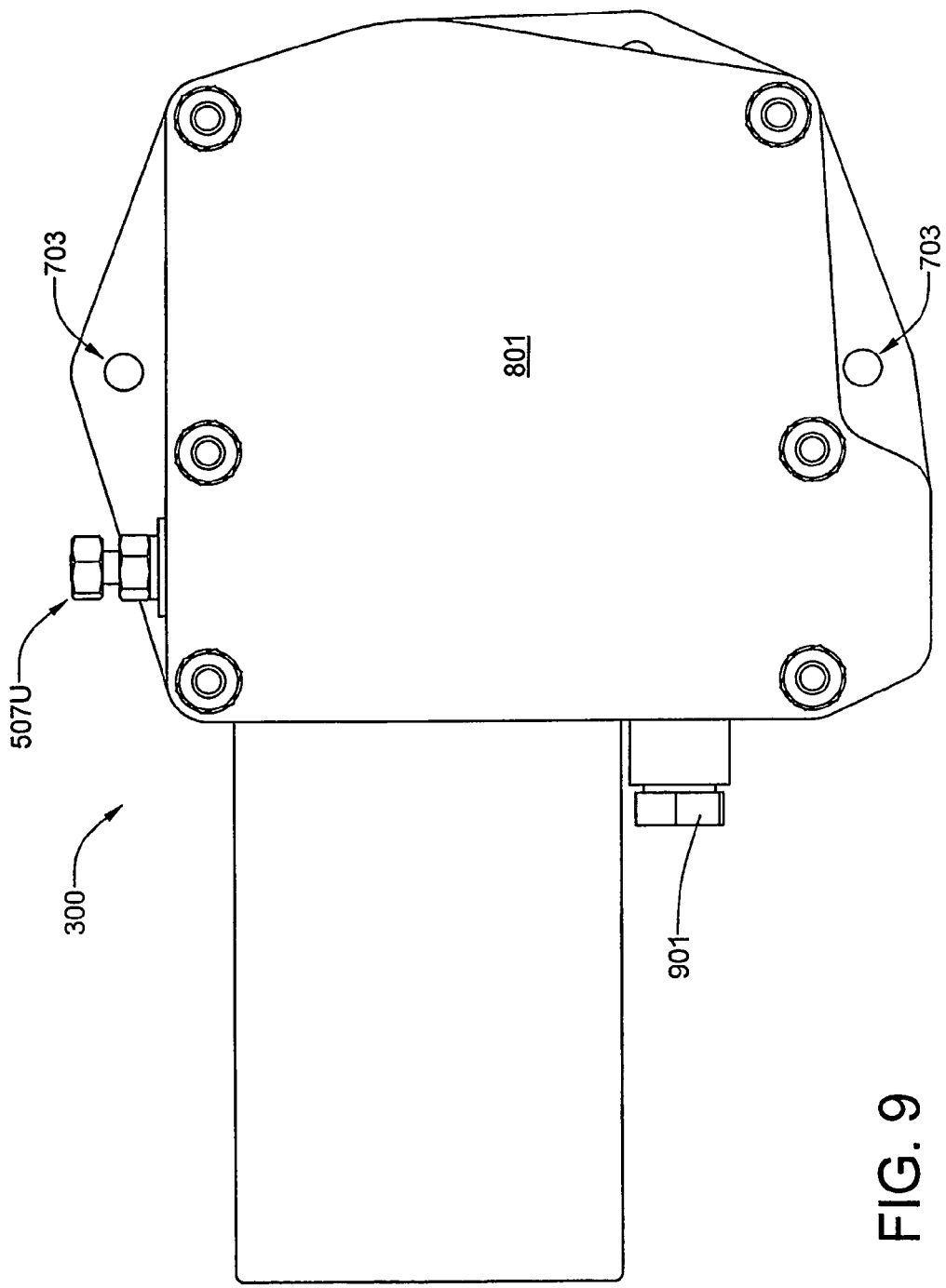
FIG. 9 is a top plan view of the first primary embodiment of the new electric-powered, gear-driven deployment system.

Referring now to FIG. 9, the top view of the deployment system, unit 300 shows both mounting holes 703 and the top electrical terminal 507U. An access plug 901 may be removed to expose the end of the intermediate drive shaft 408, which may be equipped with a hex or splined socket which may be engaged with an appropriate wrench in order to raise or lower the traction system in the event of electrical failure.

In order to deploy the system, current is applied to the electric motor for a preset period of time. The time period is slightly greater than the measured time for full deployment from a fully retracted position. Slippage of the spring-loaded clutch on the intermediate drive shaft ensures that full deployment will occur. In order to retract the system, current of reverse polarity is applied to the electric motor for a preset time period that is slightly greater than the measured time for full retraction from a fully deployed position. As a practical matter, the time required for retraction is slightly greater than the time required for deployment, as the output of motor 402 is identical in both directions, gravity is working against the system during retraction, and the chain segments 106 may need to be pulled from beneath the vehicle's tires. The variation in times required for retraction and deployment may be made identical, or nearly so, by counterbalancing the deployment arm 303.

Figure 10:
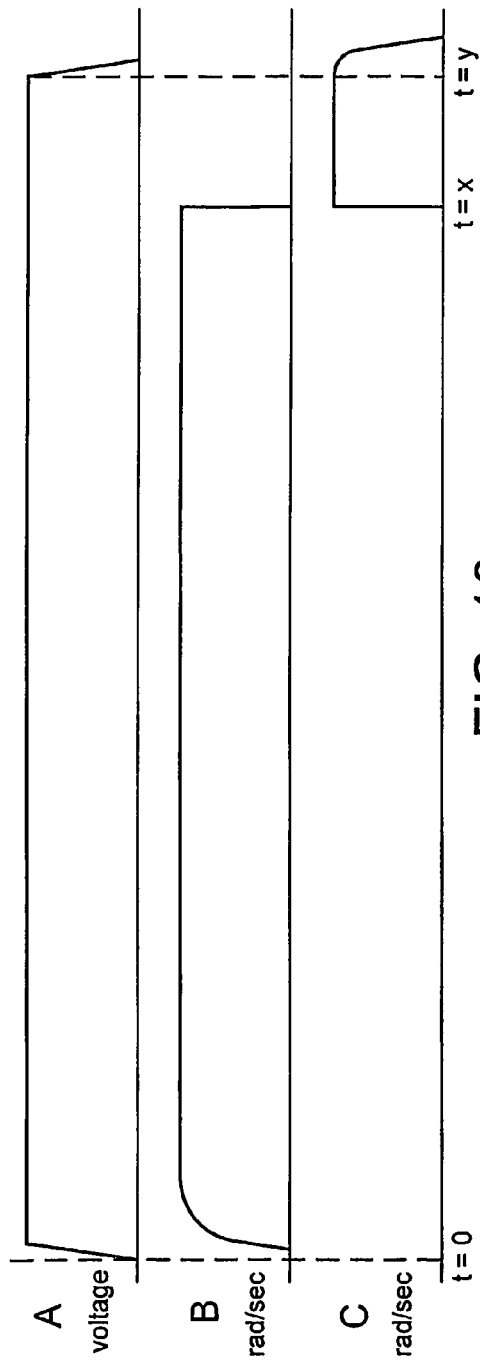
FIG. 10 is a graph of voltage, rotation of the intermediate drive shaft and rotation of the clutch with respect to the intermediate drive shaft as a function of time during system deployment.

Referring now to FIG. 10, graph A is representative of the voltage applied to the electric drive motor 402, graph B is representative of the rate of rotation of the intermediate drive shaft 408 in radians per second, and graph C is representative of the rate of rotation of the clutch 409 with respect to the intermediate drive shaft 408 in radians per second, all as a function of time during system deployment. Time t=0 represents the instant that electrical power of positive 12-14 volts is applied to the terminals of the drive motor 402. Time t=x represents the time when the friction disc 105 contacts the associated tire of the vehicle. At this instant, the intermediate shaft 408 stops turning and the clutch 409 begins slipping. The slippage time may be set to be long enough to compensate for wear of the system over its useful life, which may result in slower motor speed and increased friction among the mechanical components of the unit 300.

Figure 11:
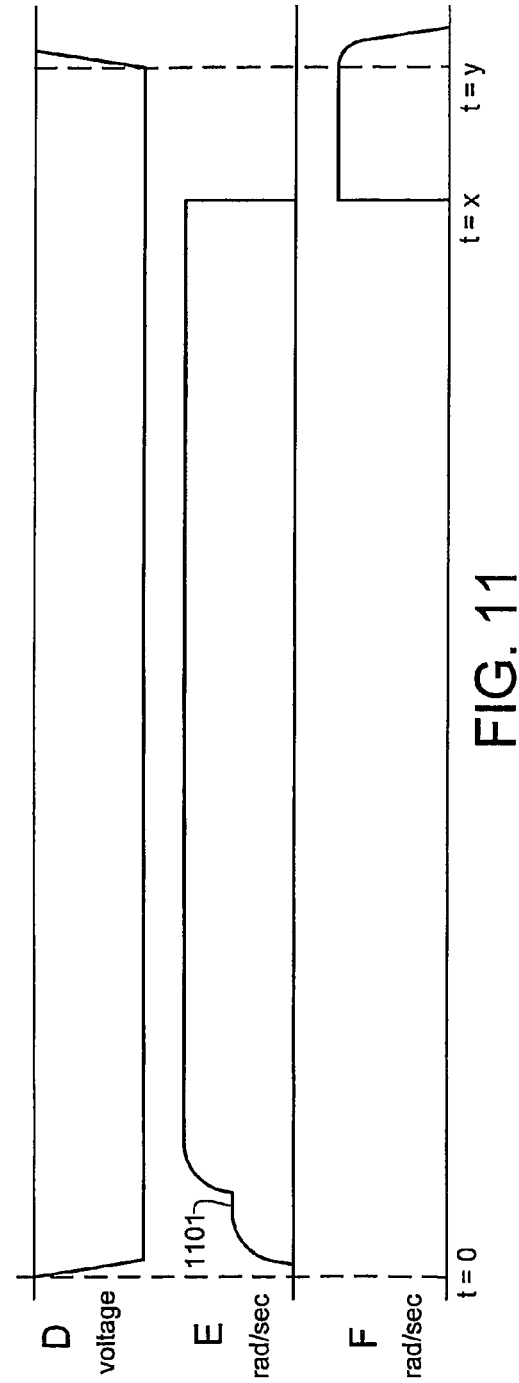
FIG. 11 is a graph of voltage, rotation of the intermediate drive shaft and rotation of the clutch with respect to the intermediate drive shaft as a function of time during system retraction.

Referring now to FIG. 11, graph A is representative of the voltage applied to the electric drive motor 402, graph B is representative of the rate of rotation of the intermediate drive shaft 408 in radians per second, and graph C is representative of the rate of rotation of the clutch 409 with respect to the intermediate drive shaft 408 in radians per second, all as a function of time during system retraction. Time t=0 represents the instant that electrical power of negative 12-14 volts is applied to the terminals of the drive motor 402. Time t=x represents the time when the deployment arm 303 reaches its limit stop. At this instant, the intermediate shaft 408 stops turning and the clutch 409 begins slipping. The slippage time may be set to be long enough to compensate for wear of the system over its useful life, which may result in slower motor speed and increased friction among the mechanical components of the unit 300.

Figure 12:
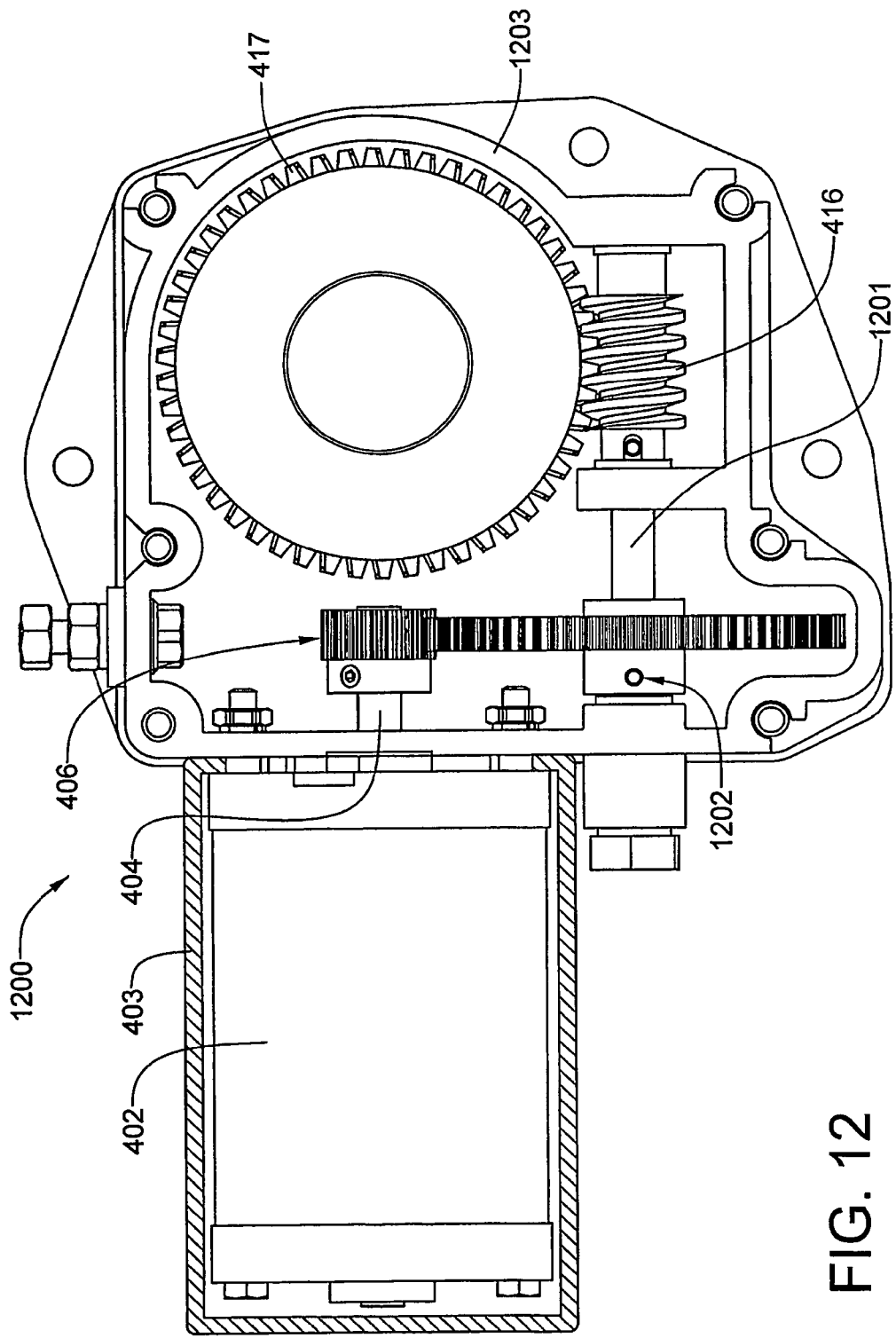
FIG. 12 is a top plan, partial cut-away view of one unit of a clutchless second primary embodiment of the new electric-powered, gear-driven deployment system, with the top cover removed to show internal components.

Referring now to FIG. 12, a second primary embodiment 1200 of the invention is similar to the first primary embodiment 300 shown in FIG. 4, with the exception that the clutch has been entirely eliminated and the driven spur gear 407 to be secured to the intermediate drive shaft 408. The elimination of the clutch permits the housing 1201 to be somewhat shorter than the housing 401 of the first primary embodiment shown in FIG. 4. Rather than limiting the torque applied to the output shaft 501 with a spring-loaded clutch 409, torque is limited by limiting the maximum amount of current that is supplied to the electric drive motor 402. The fact that torque produced by the motor 402 is essentially a linear function of the amount of current drawn by the motor, torque may be limited by limiting the amount of current that is supplied to the motor to a preset value.

Figure 13:
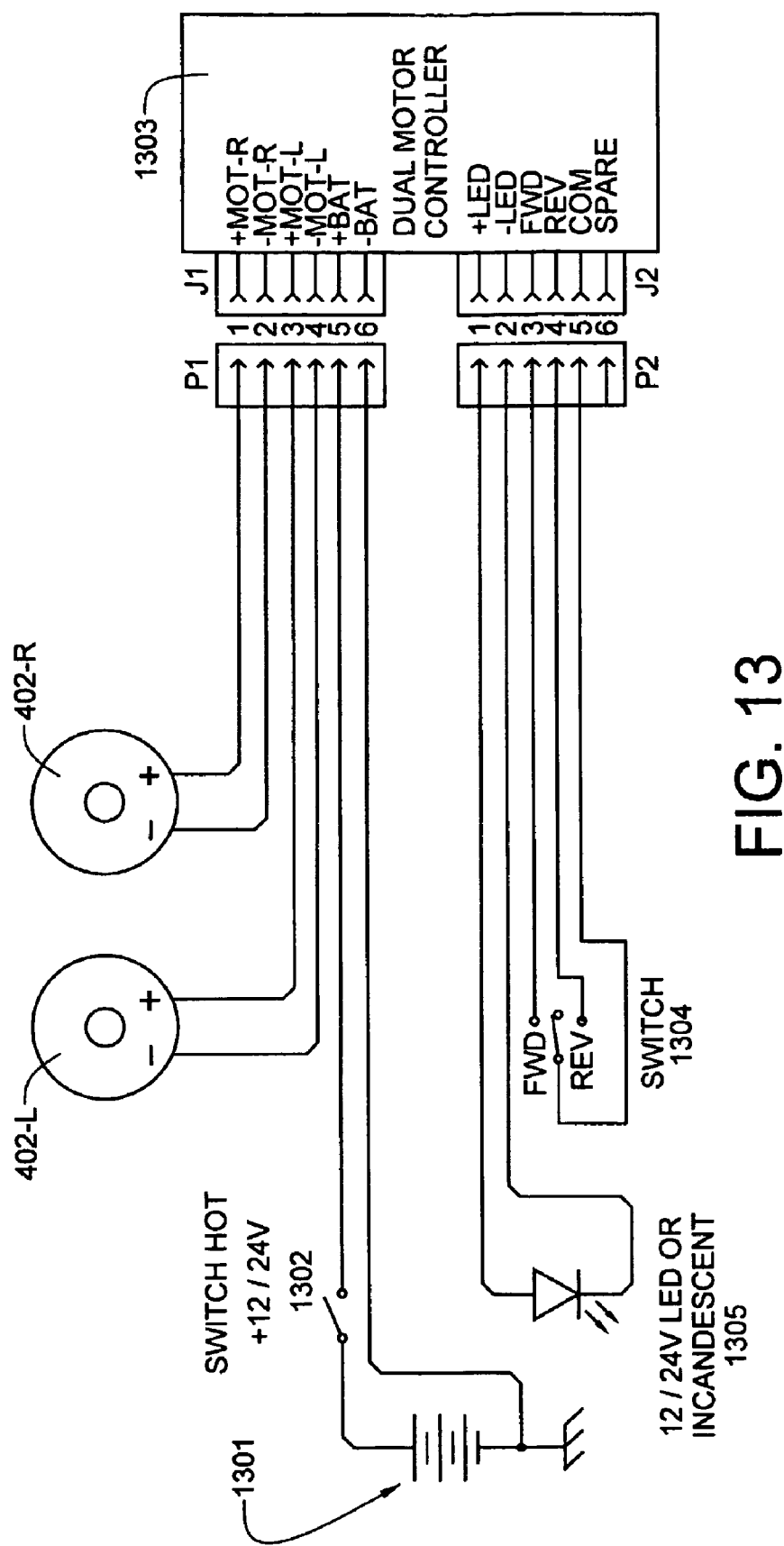
FIG. 13 is the wiring diagram for a preferred second embodiment system which includes a dual electric drive motor controller having current limiting capability.

Referring now to FIG. 13, the detailed system wiring diagram shows how the current limiting circuits are integrated into a vehicle's wiring system. As with the first main embodiment of the rapidly-deployable chain traction system shown in FIGS. 3-11, a 12 or 24-volt vehicle battery 1301 provides power for the second main embodiment system. The main power switch (i.e., ignition switch) 1302 of the vehicle provides a switchable source of power from the battery 1301 to a dual motor controller 1303, which incorporates current limiting circuitry. An electric drive motor 402-R and 402-L is provided for the traction chain deployment system positioned at the right and left rear wheel of the vehicle, respectively. Power is applied to each direct current electric drive motor 402-R and 402-L through the dual motor controller 1303 by activating a normally open forward/reverse switch 1304. While power is being sent to the electric drive motors 402-R and 402-L, a light emitting diode (LED) 1305 positioned on the dash of the vehicle is illuminated. It will be noted that in this implementation of the invention, plug P1, which includes the wiring outside the vehicle passenger compartment from the vehicle battery 1301 and the wiring to the electric drive motors 402-R and 402-L, plugs into jack J1. Plug P2, which includes the wiring inside the vehicle passenger compartment from the forward/reverse switch 1304 and from the from the LED 1305, plugs into jack J2. Both jack J1 and jack J2 are coupled to the dual motor controller 1303.

Although it would be convenient to connect an electric motor directly to a chip that controls the power supplied to it, most integrated circuit (IC) chips cannot pass enough current or voltage to spin a motor. In addition, motors tend to generate electrical noise in the form of current spikes, and can slam power back into the control circuit when the motor direction or speed is changed. Consequently, specialized circuits have been developed to supply motors with power and to isolate the other ICs from electrical problems associated with the motor. A widely used circuit for driving DC motors (whether direct drive or geared) is called an H-bridge. It is given that name because it looks like the capital letter "H" on classic schematics. With an H-bridge circuit, the motor may be driven forward or backward at any speed, even using a completely independent power source. The primary features of a preferred H-bridge circuit are:

- Almost all voltage is delivered to the motor by MOSFET transistors;
- Schottky diodes are used to protect against overvoltage or undervoltage from the motor;
- TTL/CMOS compatible driver chips are used to protect the logic chips, isolate electrical noise, and prevent potential short-circuits inherently possible in a discrete H-bridge;
- Capacitors are employed to reduce electrical noise and provide spike protection to the driver chips; and
- Pull-up resistors are employed to prevent unwanted motor movement while the microcontroller powers up or powers down.

Figure 14:
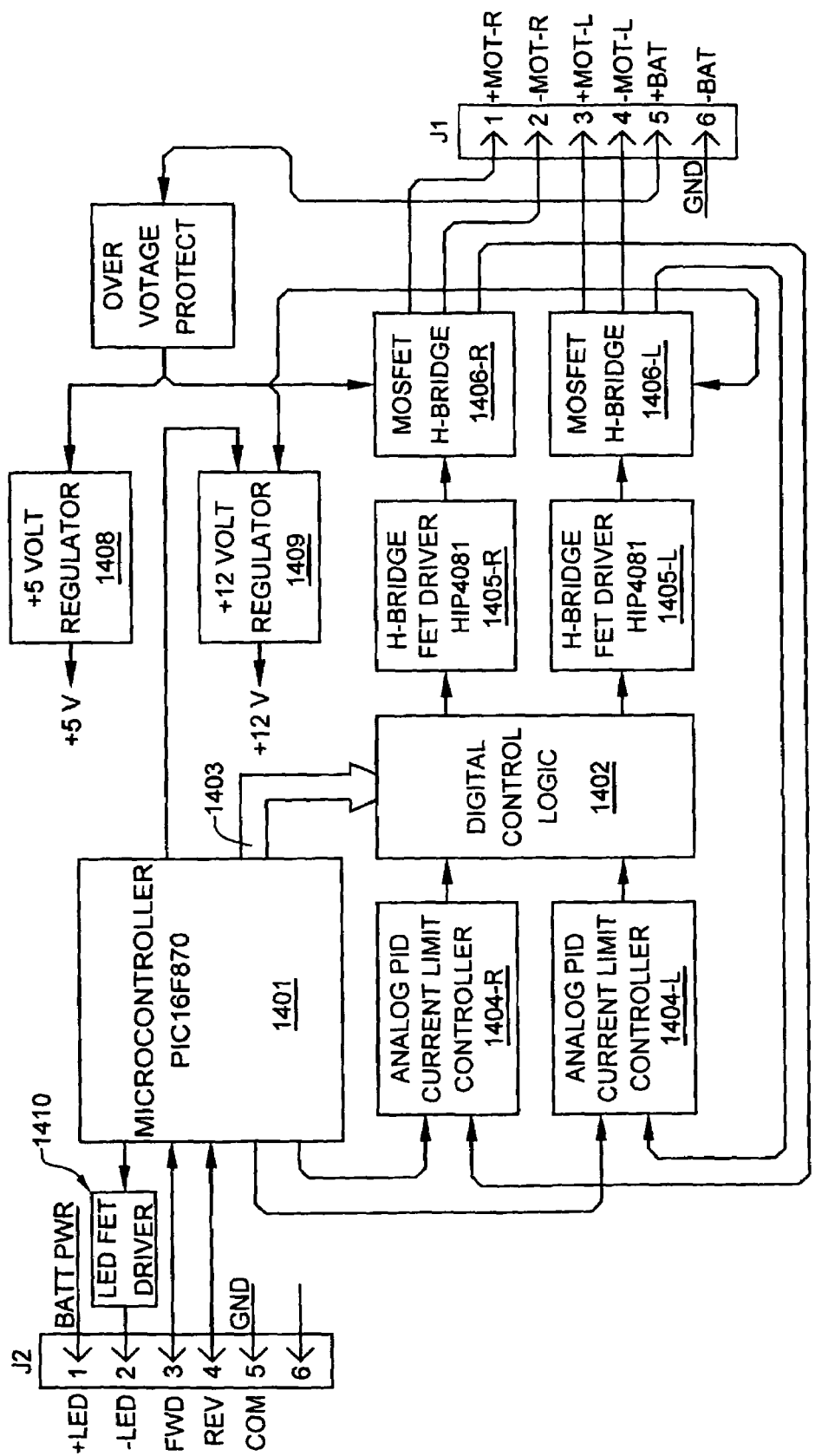
FIG. 14 is a block diagram for a printed circuit board having a dual motor controller with current limiting capability.

Referring to FIG. 14, the dual motor controller 1303 of FIG. 13 is shown in greater detail. The dual motor controller 1303 includes a microcontroller 1401, which for a preferred embodiment of the invention is a PIC16F870. The microcontroller 1401 is coupled to digital control logic 1402 via a bus 1403. The digital control logic 1402 receives inputs from a pair of analog proportional, integral, derivative (PID) controllers 1404-R and 1404-L (one for each electric drive motor 402-R and 402-L). Each of the PID current limiter controllers 1404-R and 1404-L receives control signals from the microcontroller 1401 and an associated MOSFET H-bridge. A pair of H-bridge FET drivers 1405-R and 1405-L (one also for each electric drive motor) receive control signals from the digital control logic 1402 and drive a pair of MOSFET H-bridge circuits 1406-R and 1406-L (again, one for each electric drive motor). For a preferred embodiment of the invention, the H-bridge FET drivers 1405-R and 1405-L is each a HIP4081 component. The MOSFET H-bridge circuits 1406-R and 1406-L provide drive current to the electric drive motors 402-R and 402L. Each MOSFET H-bridge circuit 1406-R and 1406-L receives battery power through an over voltage protect circuit 1407, which also provides voltage to a +5-volt regulator 1408 and to a +12-volt regulator 1409, outputs from which are used to power the integrated circuitry of the dual motor controller 1303. The microcontroller 1401 also provides a signal to an LED FET driver 1410, which drives the LED 1305.

Still referring to FIG. 14, the current supplied to each drive motor is varied independently by the FET driver, which is controlled via pulse width modulation. The digital control logic is controlled by dual pulse-width-modulated maximum power limiters, which are controlled by dual current sensors (once for each drive motor) in the dual MOSFET H-bridge circuit. For the preferred embodiment of the circuit, each of the two drive motors is controlled by a MOSFET H-bridge, which in turn is driven by an H-bridge FET driver. Each driver is activated by digital control logic that communicates with an analog current limit controller and a microcontroller. The H-bridge circuits are used to limit the current supplied to the electric drive motors (one drive motor for each drive wheel of the vehicle).

Spring loading of the deployment system is necessary due to the resiliency of the tires. Were it not for the spring loading of the output shaft, the system would not work nearly as well.

The drive motor controller circuits may be programmed so that the circuit remembers whether the chain system is deployed or retracted. A momentary toggle switch is used to send a deployment or retraction signal to the controller circuit. It is designed to require two inputs within a second or so for safety reasons in case the toggle switch is inadvertently bumped. By monitoring current applied to the motor 402, the dual motor controller circuitry 1400 can tell where the mechanism is in the deployment process.

A primary feature of either embodiment of the system is that no electrical components, other than cables, are subjected to salt and slush. Only two wires connect to each drive motor.

Though only two embodiments of the invention have been disclosed and described herein, it will be obvious to those of ordinary skill in the art that modifications and changes may be made thereto without departing from the spirit and scope of the invention as hereinafter claimed.

What is claimed is:

1. A rapidly-deployable chain traction system comprising:
   a sealed housing having an input and output apertures;
   an electric drive motor, having reversible rotational output, secured to said housing and having an armature shaft extending through the input aperture;
   an intermediate drive shaft rotatably mounted within said sealed housing;
   a speed-reduction gear train interposed between said armature shaft and said spring-loaded clutch;
   a worm axially installed on said intermediate drive shaft;
   an output shaft rotatably mounted within said sealed housing and extending through said output aperture;
   a deployment arm coupled to a portion of said output shaft that is external to said sealed housing, said deployment arm having rotatably mounted thereto a friction drive disc, said friction drive disc having peripherally attached thereto a plurality of chain segments;
   a worm gear coupled to said output shaft, which meshes with the worm on said intermediate drive shaft, rotational movement of said worm imparting rotational movement to said output shaft;
   a shock damper coupled to said output shaft, which mitigates shock loads applied to the worm and worm gear, said shock loads associated with rotational moments of the deployment arm caused primarily by uneven road surfaces; and
   means for limiting torque applied to said output shaft by said electric motor.

2. The rapidly-deployable chain traction system of claim 1, wherein said speed reduction gear train comprises a spur pinion gear mounted on said armature shaft which drives a driven spur gear axially mounted on said intermediate drive shaft.

3. The rapidly-deployable chain traction system of claim 2, wherein said spring-loaded clutch comprises a driven disk affixed to said intermediate shaft, the driven spur gear which is mounted not only axially, but rotatably, on said intermediate shaft adjacent said driven disk, a friction disk rotatably interposed between said driven disk and said driven spur gear, and a biasing spring which compresses said friction disk between an adjoining face of said driven disk and an adjoining face of said driven spur gear, said spring loaded clutch acting to couple said driven spur gear to said intermediate drive shaft for torque loads up to a maximum determined by the spring constant of said biasing spring.

4. The rapidly-deployable chain traction system of claim 3, wherein said shock damper includes a coil spring that is circumferentially, rather than torsionally loaded.

5. The rapidly-deployable chain traction system of claim 1, wherein said means for limiting torque applied to the output shaft by said electric motor is a circuit which limits current drawn by the electric drive motor to a preset maximum.

6. The rapidly-deployable chain traction system of claim 5, wherein the current limiting circuit comprises a microcontroller, digital control logic, and for each electric motor, an analog PID current limit controller, an H-bridge FET driver, and a MOSFET H-bridge, each of said PID current limiter controllers receiving control signals from the microcontroller and an associated MOSFET H-bridge, said digital control logic receiving control signals from the microcontroller and the analog PID current limit controllers, and said H-bridge drivers receiving control signals from the digital control logic.

7. The rapidly-deployable chain traction system of claim 1, wherein said worm and worm gear combination provides a further speed reduction between said electric drive motor and said output shaft, and also provides rotational locking of said output shaft.

8. The rapidly-deployable chain traction system of claim 1, wherein said worm gear is affixed directly to said shock damper.

9. The rapidly-deployable chain traction system of claim 1, wherein said speed-reduction gear train, said spring-loaded clutch, said intermediate drive shaft, said worm, said worm gear, and said shock damper are immersed in an oil bath.

10. The rapidly-deployable chain traction system of claim 1, wherein said means for limiting torque applied to the output shaft by said electric motor comprises a spring-loaded clutch coupled to said intermediate drive shaft, said clutch limiting the amount of torque which may be applied to said intermediate drive shaft.

11. A rapidly-deployable chain traction system comprising:
   a sealed housing having an input and output apertures;
   an electric drive motor, having reversible rotational output, secured to said housing and having an armature shaft extending through the input aperture;
   an output shaft rotatably mounted within said sealed housing and extending through said output aperture;
   a speed-reduction gear train which couples said electric drive motor and said output shaft, said gear train incorporating an output shaft rotational locking device and a shock damper which mitigates shock loads applied to said rotational locking device, the shock loads being associated with rotational moments of the deployment arm caused primarily by uneven road surfaces;
   a deployment arm coupled to a portion of said output shaft that is external to said sealed housing, said deployment arm having rotatably mounted thereto a friction drive disc, said friction drive disc having peripherally attached thereto a plurality of chain segments; and means for limiting torque applied to said output shaft by said electric motor.

12. The rapidly-deployable chain traction system of claim 11, wherein said means for limiting torque applied to the output shaft by said electric motor is a circuit which limits current drawn by the electric drive motor to a preset maximum.

13. The rapidly-deployable chain traction system of claim 12, wherein the current limiting circuit comprises a microcontroller, digital control logic, and for each electric motor, an analog PID current limit controller, an H-bridge FET driver, and a MOSFET H-bridge, each of said PID current limiter controllers receiving control signals from the microcontroller and an associated MOSFET H-bridge, said digital control logic receiving control signals from the microcontroller and the analog PID current limit controllers, and said H-bridge drivers receiving control signals from the digital control logic.

14. The rapidly-deployable chain traction system of claim 11, wherein said speed-reduction gear train comprises:
   a spur pinion gear mounted on the armature shaft;
   an intermediate drive shaft rotatably mounted within said sealed housing; and
   a driven spur gear rotatably mounted on said intermediate drive shaft and rotationally coupled thereto via said clutch.

15. The rapidly-deployable chain traction system of claim 11, wherein said output shaft rotational locking device comprises a worm axially secured to said intermediate drive shaft; and
   a worm gear coupled to said output shaft via said shock damper, said worm gear being driven by said worm.

16. The rapidly-deployable chain traction system of claim 11, wherein said means for limiting torque applied to the output shaft by said electric motor comprises a spring-loaded clutch that is incorporated in the gear train.

17. A rapidly-deployable chain traction system comprising:
   a reversible electric drive motor having an armature shaft;
   an intermediate drive shaft;
   a speed-reduction gear train which couples said armature shaft to said spring-loaded clutch;
   a worm axially affixed to said intermediate drive shaft;
   an output shaft;
   a shock damper affixed to said output shaft;
   a worm gear affixed to said shock damper, said worm gear meshing with said worm, and providing rotational locking for said output shaft;
   a deployment arm coupled to said output shaft, said deployment arm having rotatably mounted thereto a friction drive disc, said friction drive disc having peripherally attached thereto a plurality of chain segments; and
   means for limiting torque applied to said output shaft.

18. The rapidly-deployable chain traction system of claim 17, wherein said shock damper mitigates shock loads applied to said worm and worm gear, the shock loads being associated with rotational moments of the deployment arm caused primarily by uneven road surfaces.

19. The rapidly-deployable chain traction system of claim 17, wherein said spring-loaded clutch comprises a driven disk affixed to said intermediate shaft, the driven spur gear which is mounted not only axially, but rotatably, on said intermediate shaft adjacent said driven disk, a friction disk rotatably interposed between said driven disk and said driven spur gear, and a biasing spring which compresses said friction disk between an adjoining face of said driven disk and an adjoining face of said driven spur gear, said spring loaded clutch acting to couple said driven spur gear to said intermediate drive shaft for torque loads up to a maximum determined by the spring constant of said biasing spring.

20. The rapidly-deployable chain traction system of claim 17, wherein said means for limiting torque applied to said output shaft is selected from the group consisting of spring-loaded clutch that is incorporated in the gear train and a circuit which limits current drawn by the electric drive motor to a preset maximum.

* * * * *